(12) United States Patent
Seo et al.

(10) Patent No.: US 8,356,939 B2
(45) Date of Patent: Jan. 22, 2013

(54) PROTECTIVE COVER AND WHEEL ROLLING BEARING DEVICE INCORPORATING THE PROTECTIVE COVER

(75) Inventors: Nobuyuki Seo, Toyoake (JP); Yoshinori Masuda, Gose (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 336 days.

(21) Appl. No.: 12/734,237

(22) PCT Filed: Oct. 23, 2008

(86) PCT No.: PCT/JP2008/069224
§ 371 (c)(1),
(2), (4) Date: Apr. 20, 2010

(87) PCT Pub. No.: WO2009/054449
PCT Pub. Date: Apr. 30, 2009

(65) Prior Publication Data
US 2010/0209032 A1 Aug. 19, 2010

(30) Foreign Application Priority Data

Oct. 23, 2007 (JP) ................................ P2007-275424
Nov. 8, 2007 (JP) ................................ P2007-290477

(51) Int. Cl.
*F16C 41/04* (2006.01)
*G01B 7/30* (2006.01)
(52) U.S. Cl. ..................... 384/448; 384/489; 324/207.25
(58) Field of Classification Search .................. 384/448, 384/489, 544, 589; 324/207.25, 173, 174
See application file for complete search history.

(56) References Cited

U.S. PATENT DOCUMENTS

| | | | |
|---|---|---|---|
| 5,310,266 A * | 5/1994 | Coux et al. ..................... 384/448 |
| 6,593,733 B1 | 7/2003 | Nicot | |
| 6,688,770 B1 | 2/2004 | Schottdorf et al. | |
| 7,088,093 B2 * | 8/2006 | Teshima et al. ............... 324/174 |
| 2004/0105603 A1 | 6/2004 | Ohtsuki et al. | |
| 2004/0170345 A1 | 9/2004 | Takada | |

FOREIGN PATENT DOCUMENTS

| | | |
|---|---|---|
| DE | 199 47 157 A1 | 4/2001 |
| EP | 1 426 257 A2 | 6/2004 |

(Continued)

OTHER PUBLICATIONS

European Search Report dated Jun. 1, 2011.

*Primary Examiner* — Thomas R Hannon
(74) *Attorney, Agent, or Firm* — McGinn IP Law Group, PLLC

(57) ABSTRACT

An annular recess is formed in a vehicle inner side of a wheel rolling bearing device. A protective cover is attached to an inner ring disposed in a bottom side of the recess to protect an annular magnetic encoder. A cover body of the protective cover is formed with an annular first disk portion covering the magnetic encoder, a cylindrical portion extending from a radial outer end of the first disk portion and fitted into an inner circumferential wall of the recess, and a second disk portion extending radially outward from an upper end of the cylindrical portion and covering the end portion of the outer ring located around the recess. The cover body is formed with a to-be-separated portion constituted by at least one of half-cut grooves and perforations extending in a radial direction of the cover body. The cover body is formed with lugs which are projected from the second disk portion.

16 Claims, 17 Drawing Sheets

FOREIGN PATENT DOCUMENTS

| | | |
|---|---|---|
| JP | 2002-333033 | 11/2002 |
| JP | 2003-35717 | 2/2003 |
| JP | 2003-254345 | 9/2003 |
| JP | 2004-198378 | 7/2004 |
| JP | 2005-282767 | 10/2005 |
| JP | 2006-183712 | 7/2006 |

* cited by examiner

Fig. 22(a)
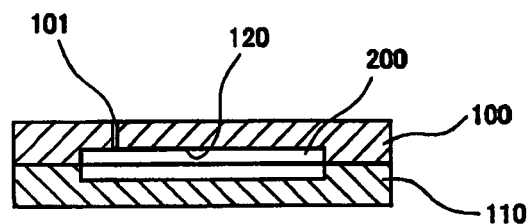
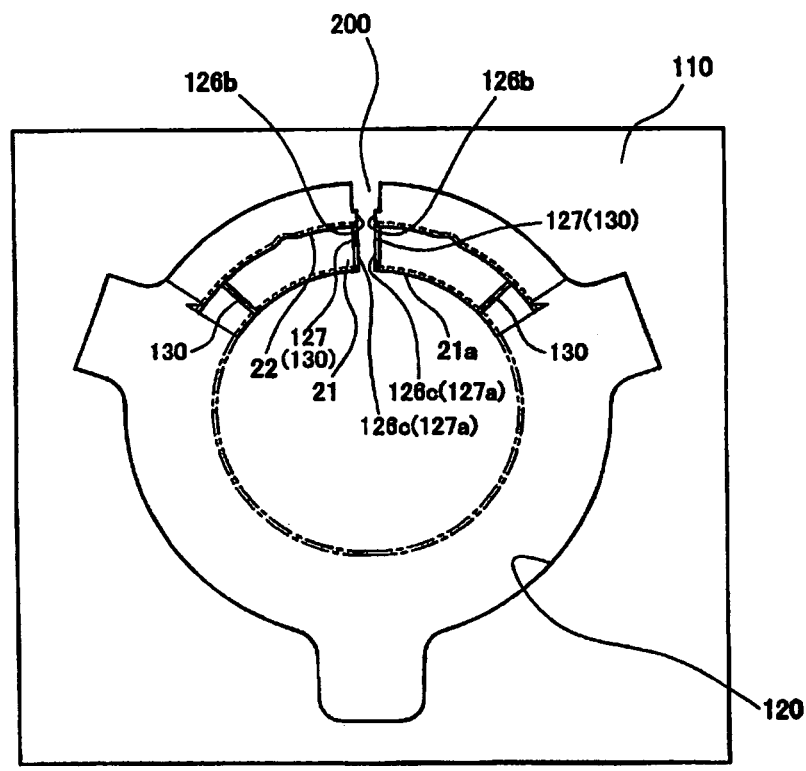
Fig. 22(b)

CROSS SECTION A-A

CROSS SECTION B-B

CROSS SECTION C-C

CROSS SECTION D-D

PROTECTIVE COVER AND WHEEL ROLLING BEARING DEVICE INCORPORATING THE PROTECTIVE COVER

TECHNICAL FIELD

The present invention relates to a protective cover used with a wheel rolling bearing device provided with a magnetic encoder and to a wheel rolling bearing device incorporating the protective cover.

BACKGROUND ART

As shown in FIG. 1, there is known a rear wheel suspension C in an axle suspension system in which a wheel B is mounted on each of a left-right pair of rear axle shafts A which are connected by way of a differential. This rear wheel suspension C is formed as a semi-floating type in which a bearing D is incorporated at one end side of the rear axle shaft A, and an outer ring side D1 in this bearing D is fixed to a cylindrical rear axle housing E so that the rear axle shaft A is rotatably supported by an inner ring side D2 in the bearing D.

In addition, a rotation detecting device for detecting the rotation speed of the wheel is attached to such a bearing which is used for rotatably supporting the wheel. As the rotation detecting device, a hub to which the wheel is mounted and a bearing unit consisting of a bearing including an inner ring side rotatably supporting the hub and an outer ring side fixed to the suspension are used. A magnetic encoder is fixed to the vehicle inner side in the inner ring side of the bearing of this bearing unit. An annular protection plate for covering the magnetic encoder is provided on the vehicle inner side in the outer ring side, and a sensor is disposed so as to oppose the magnetic encoder through the protection plate interposed therebetween. Thus, there is known a configuration wherein the rotation change of the magnetic encoder which is rotated in conjunction with the rotation of the wheel is detected by the sensor (see Japanese Patent Publication No. 2002-333033A).
Patent Document 1: Japanese Patent Publication No. 2002-333033A

DISCLOSURE OF THE INVENTION

Problems to be Solved by the Invention

With the above-described rear wheel suspension C, in order to fix the bearing D to the rear axle shaft A, the rear axle shaft A is held vertically, the bearing D and peripheral parts F such as a spacer and a retainer ring for fixing the bearing D on the vehicle inner side are passed over the rear axle shaft A and are dropped down from above the rear axle shaft A. Subsequently, the bearing D and the peripheral parts F are simultaneously press-fitted to an outer periphery of a press-fitting shaft portion A1 of the rear axle shaft A by a press-fitting jig, so that the vehicle inner side of the bearing D is fixed by the peripheral parts F.

However, since an intermediate shaft portion A2 of the rear axle shaft A, onto which the bearing D and the peripheral parts F are dropped down, is smaller in diameter than the press-fitting shaft portion A1, the axial center of the bearing D and the peripheral parts F could be displaced before the press-fitting is performed so that they drop down with inclined attitudes. For this reason, ends of the bearing D and the peripheral parts F would collide against each other. Therefore, if the magnetic encoder such as the one disclosed in Patent Document 1 is mounted on the end side of the bearing D, the magnetic encoder would be damaged by the peripheral part F.

Accordingly, although it is possible to protect the magnetic encoder by using an annular protection plate as disclosed in Japanese Patent Publication No. 2002-333033A, since this protection plate is in close contact with the magnetic encoder, there is a possibility that the magnetic encoder is damaged indirectly by an impact caused by the dropping of the peripheral part F. To prevent this damage, it is necessary to make the protection plate thick (becomes heavy).

In addition, with this type of rear wheel suspension C, the protection plate becomes unnecessary after the assembly of the bearing D to the rear axle shaft A. For this reason, to remove an annular protection plate H (see FIG. 1) from the rear axle shaft A, it is necessary to lift up the protection plate H. In a case where the shaft length of the rear axle shaft A is about one meter, the raising and lowering operations of arms at the time of lifting up the protection plate H become large and difficult. Hence, if such operations are continuously repeated, the working environment is aggravated and undesirable.

An object of the present invention is to provide a protective cover capable of avoiding adhesion of metallic foreign objects to a magnetic encoder and damage of the magnetic encoder, and facilitating the removal operation after the assembly to the axle shaft, to provide a wheel rolling bearing device incorporating the protective cover, and to provide a method of attaching and detaching the protective cover.

How to Solve the Problems and Advantageous Effect of the Invention

In order to achieve the above objects, the invention is characterized by the items (1) through (13) listed below.
(1) A protective cover configured to protect an annular magnetic encoder, the protective cover being formed with a removal portion causing the protective cover attached to the magnetic encoder to be removable from the magnetic encoder.
(2) The protective cover as set forth in (1), wherein:
the protective cover is adapted to be used with a wheel rolling bearing device which comprises:
an inner ring, adapted to be fitted with an outer periphery of an axle shaft by inserting the axle shaft in an axial direction thereof;
an outer ring, disposed coaxially with the inner ring and fixed on an axle housing; and
a rolling element, disposed between the inner ring and the outer ring.
(3) The protective cover as set forth in (2), wherein:
an end portion of the outer ring is projected from an end portion of the inner ring so that an annular recess is formed in a vehicle inner side of the wheel rolling bearing device;
the annular magnetic encoder is attached to the inner ring located in a bottom side of the recess;
the protective cover is formed with an annular cover body which comprises:
  a first disk portion, covering the magnetic encoder while being spaced from the magnetic encoder by a prescribed distance toward the vehicle inner side;
  a cylindrical portion, extending from a radial outer end of the first disk portion in the axial direction, and fitted into an inner circumferential wall of the recess; and
  a second disk portion, extending radially outward from an upper end of the cylindrical portion, and covering the end portion of the outer ring located around the recess.

(4) The protective cover as set forth in (3), wherein:
the cover body is formed with a to-be-separated portion constituted by at least one of half-cut grooves and perforations extending in a radial direction of the cover body; and
the cover body is formed with lugs which are projected radially outward from both sides of a radial outer end of the second disk portion in another radial direction intersecting with the radial direction.

(5) The protective cover as set forth in (3), wherein:
the radial outer end of the second disk portion of the cover body is formed with a gripper extending radially outward and being projected from a radial outer end of the outer ring; and
a to-be-separated portion constituted by at least one of half-cut grooves and perforations are formed so as to extend from the first disk portion to the second disk portion at such a position that is brought into contact with an outer peripheral surface of the axle shaft press-fitted into the inner ring when the gripper is moved radially outward, or at a vicinity of the position.

(6) A wheel rolling bearing device, comprising:
an outer ring;
an inner ring, disposed coaxially with the outer ring;
a rolling element, disposed between the outer ring and the inner ring;
an axle shaft, extending through the inner ring in an axial direction thereof;
a recess, formed in a vehicle inner side of the wheel rolling bearing device;
an annular magnetic encoder, attached to a bottom side of the recess; and
the protective cover as set forth in (1), covering the magnetic encoder.

(7) The protective cover as set forth in (3), wherein:
the cover body is formed with a to-be-separated portion extending in a radial direction of the cover body, and having a partial stiffness weaker than another part in a circumferential direction of the cover body, thereby being separable;
the cover body is monolithic to protect the magnetic encoder when the cover body is inserted and held in the recess of the wheel rolling bearing device; and
the cover body is configured to be moved to the inner vehicle side intersecting with the axial direction while the to-be-separated portion is separated and opened in the circumferential direction when the cover body is detached from the recess after the axle shaft is inserted and fixed to the wheel rolling bearing device, so that the cover body is removed from the wheel rolling bearing device and the axle shaft.

(8) The protective cover as set forth in (3), wherein:
the cover body is formed with a to-be-separated portion having separated surfaces which are separated in advance by a separating zone extending in a radial direction of the cover body and are abutted against each other, so that the cover body has a partial stiffness weaker than another part in a circumferential direction of the cover body, thereby being reseparable;
the cover body is monolithic to protect the magnetic encoder when the cover body is inserted and held in the recess of the wheel rolling bearing device; and
the cover body is configured to be moved to the inner vehicle side intersecting with the axial direction while the to-be-separated portion is reseparated and opened in the circumferential direction when the cover body is detached from the recess after the axle shaft is inserted and fixed to the wheel rolling bearing device, so that the cover body is removed from the wheel rolling bearing device and the axle shaft.

(9) The protective cover as set forth in (8), wherein:
the separated surfaces located in both sides of the separating zone include abutment surfaces at least parts of which are brought into close contact with each other when the cover body is inserted and held in the recess of the wheel rolling bearing device, and are reseparated and opened in the circumferential direction when the cover body is detached from the recess.

(10) The protective cover as set forth in (8), wherein:
wall portions are formed along the abutment surfaces so as to project toward the vehicle inner side, and are configured to be brought into contact with each other in the circumferential direction when the cover body is inserted and held in the recess of the wheel rolling bearing device.

(11) The protective cover as set forth in (7), wherein:
the radial outer end of the second disk portion is formed with a gripper extending radially outward and being projected from a radial outer end of the outer ring, and configured to be moved further outward by being pulled toward the vehicle inner side intersecting with the axial direction when the cover body is detached from the recess; and
the to-be-separated portion is formed on the cover body so as to extend in a direction that the gripper is pulled.

(12) A wheel rolling bearing device, wherein:
the protective cover as set forth in (7) is inserted and held in the recess;
the inner ring is fitted with the outer periphery of the axle shaft by inserting the axle shaft in the axial direction; and
the outer ring is disposed coaxially with the inner ring and fixed to the axle housing.

(13) A method of attaching and detaching a protective cover, comprising:
inserting and holding the protective cover as set forth in (7) in the recess; and
moving the cover body to the inner vehicle side intersecting with the axial direction so that the to-be-separated portion is separated and opened in the circumferential direction when the cover body is detached from the recess after the axle shaft is inserted and fixed to the wheel rolling bearing device, thereby removing the cover body from the wheel rolling bearing device and the axle shaft.

With the above configurations, it is possible to avoid adhesion of metallic foreign objects to a magnetic encoder and damage of the magnetic encoder, after the protective cover is attached. Further, it is possible to provide the wheel rolling bearing device wherein the removable operation of the protective cover after the assembly to the axle shaft can be facilitated.

BRIEF DESCRIPTION OF THE DRAWINGS

FIGS. 22(a) and 22(b) are views showing a manufacturing method of the protective cover.

BEST MODE FOR CARRYING OUT THE INVENTION

Figure 2:
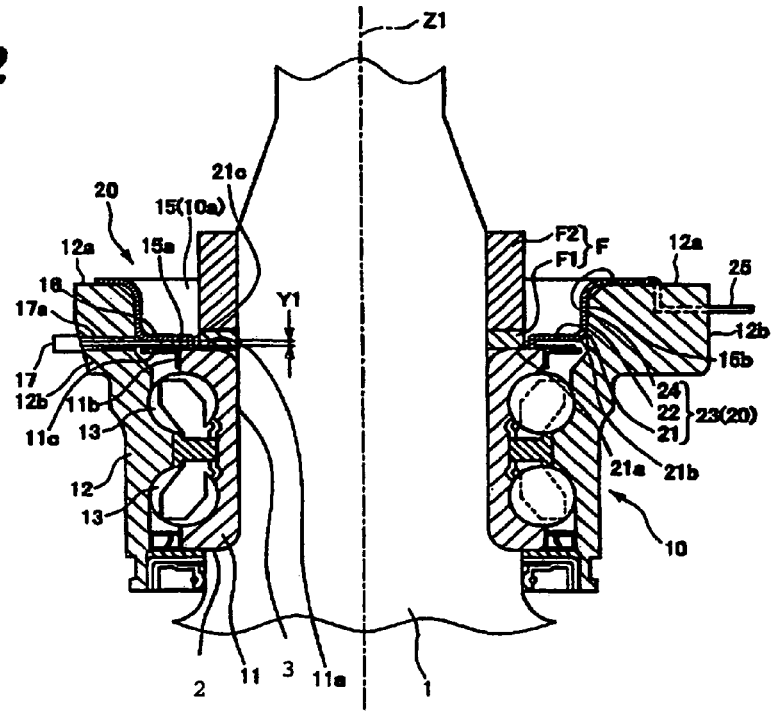
FIG. 2 is a section view showing an assembled state of a wheel rolling bearing device wherein a protective cover according to a first embodiment of the invention is attached.
Figure 3:
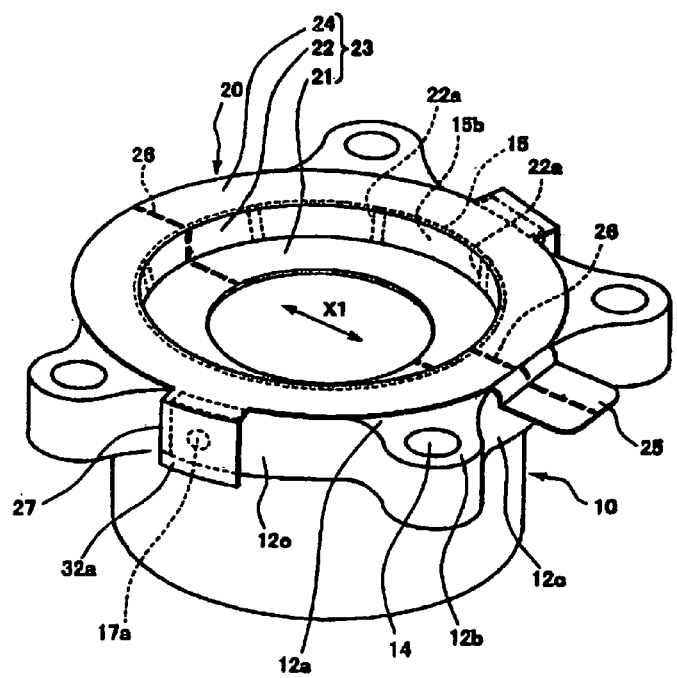
FIG. 3 is a perspective view of the wheel rolling bearing device shown in FIG. 2.
Figure 4:
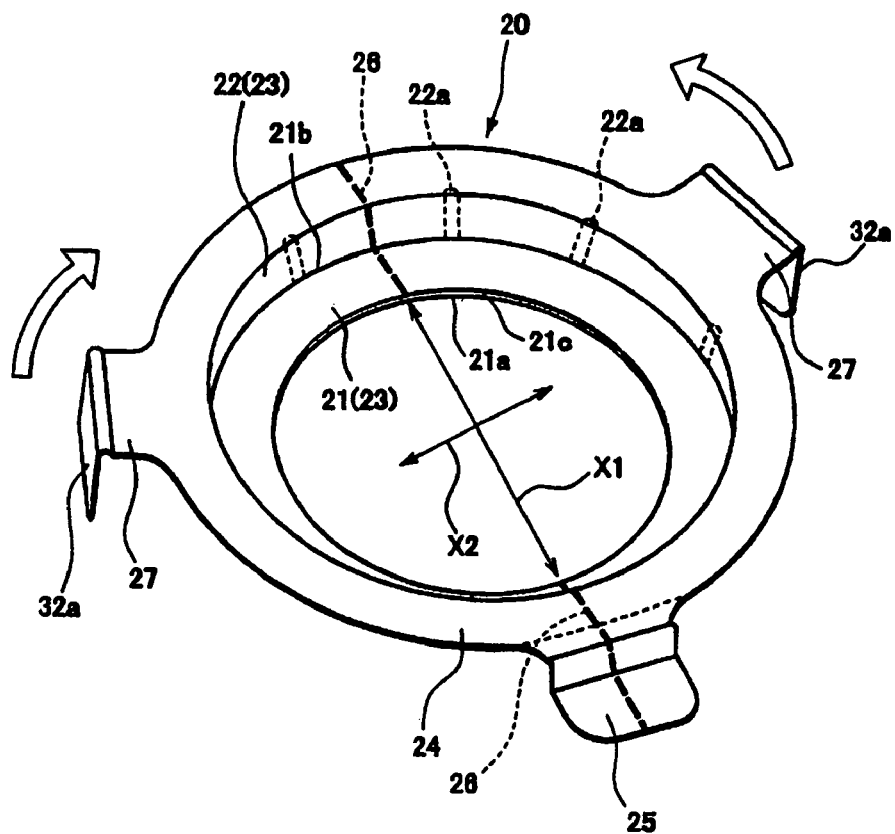
FIG. 4 is a perspective view of the protective cover shown in FIG. 3.
Figure 5:
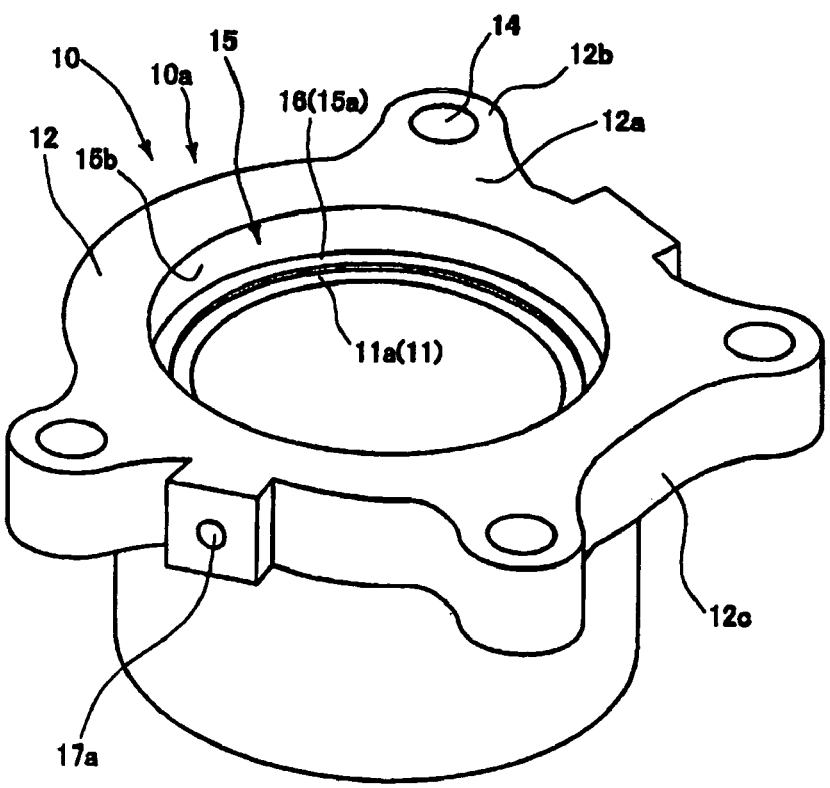
FIG. 5 is a perspective view showing the wheel rolling bearing device wherein the protective cover is removed.

Embodiments of the invention will be described below with reference to examples shown in the drawings. FIG. 2 is a section view showing an assembled state of a wheel rolling bearing device wherein a protective cover according to a first embodiment of the invention is attached. FIG. 3 is a perspective view of the wheel rolling bearing device shown in FIG. 2. FIG. 4 is a perspective view of the protective cover shown in FIG. 3. FIG. 5 is a perspective view showing the wheel rolling bearing device wherein the protective cover is removed.

Figure 1:
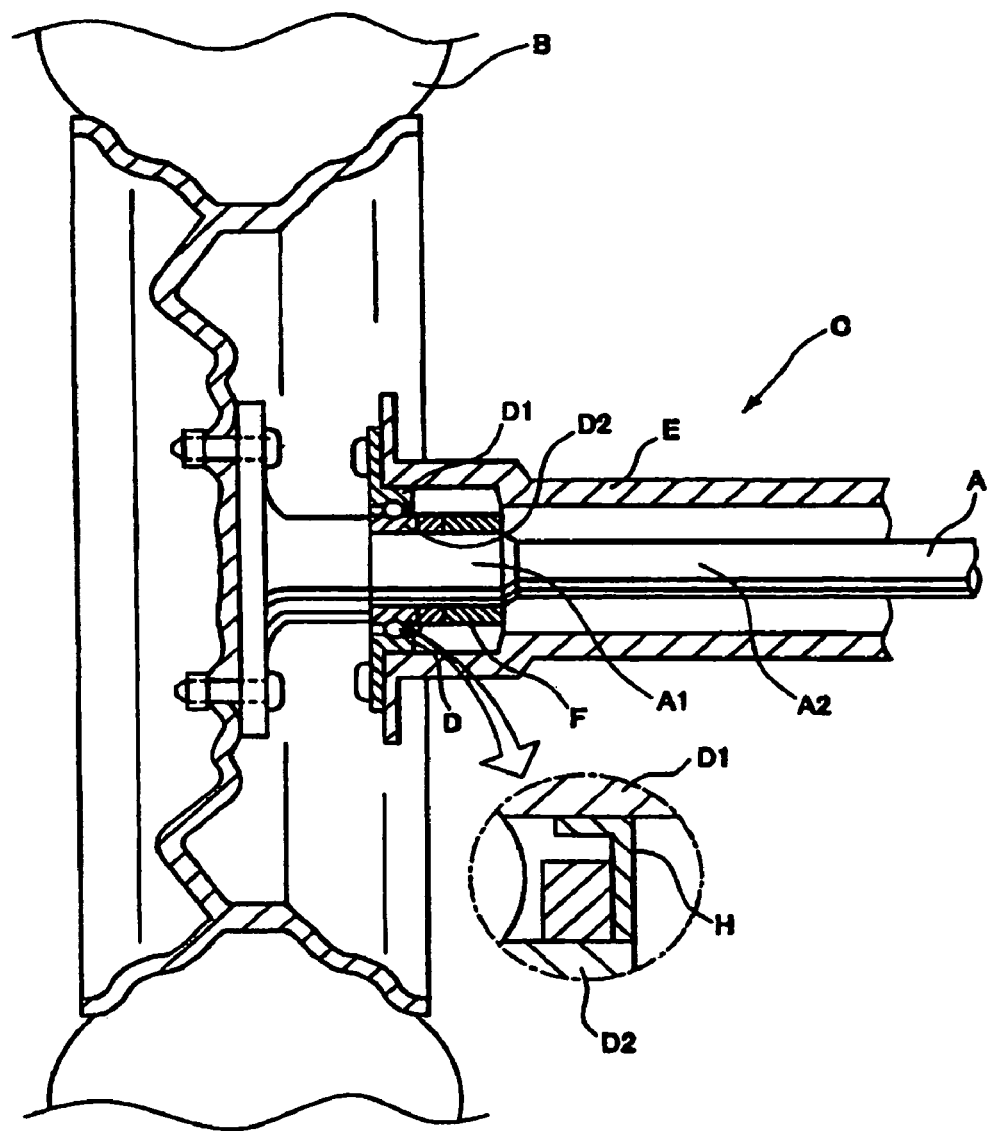
FIG. 1 is a schematic view showing a rear wheel suspension in an axle suspension system.

This wheel rolling bearing device 10 is used in substitution for the bearing. D of the rear wheel suspension C in the axle suspension type as an underlying premise similar to the background art shown in FIG. 1. A specific example of the wheel rolling bearing device 10 is constituted by, for example, a double-row outer-directed angular contact ball bearing, as shown in FIG. 2. This wheel rolling bearing device 10 includes: an inner ring 11 into which a rear axle shaft 1 serving as an axle shaft is inserted in its axial direction Z1 and which is fitted on the rear axle shaft 1 by press-fitting; an outer ring 12 disposed concentrically with this inner ring 11; and rolling elements 13 interposed between the inner ring 11 and the outer ring 12. As shown in FIG. 5, flanges 12b for fixing to a rear axle housing E serving as an axle housing is monolithically formed on an outer peripheral side of an end portion 12a of the outer ring 12 on the vehicle inner side. Bolt insertion holes 14 for insertion of bolts are formed in the flanges 12b, so that the flanges are fixed to the rear axle housing E by the bolts.

Returning to FIG. 2, the vehicle outer side of the rear axle shaft 1 is formed with a step portion 2 to which the inner ring 11 of the wheel rolling bearing device 10 is abutted to be positioned thereon. The vehicle inner side continued from the step portion 2 is formed with a press-fitting shaft portion 3 on which the inner ring 11 of the wheel rolling bearing device 10 is fitted by press-fitting. This press-fitting shaft portion 3 has such a shaft length that the inner ring 11 of the wheel rolling bearing device 10 and peripheral parts F, such as a spacer F1 and a retainer ring F2 (discussed later) for fixing the wheel rolling bearing device 10, can be fitted thereon by press-fitting.

In addition, a recess 15 is formed on a side end 10a on the vehicle inner side of the wheel rolling bearing device 10. This recess 15 is formed by causing the end portion 12a on the vehicle inner side of the outer ring 12 to project toward the vehicle inner side than an end portion 11a of the inner ring 11.

On a radial outer end 11b of the inner ring 11 located in a bottom side 15a of the recess 15 of the wheel rolling bearing device 10, an annular magnetic encoder 16 is fitted and fixed to a fixing bracket 11c which is fixed to the radial outer end 11b by press-fitting. This magnetic encoder 16 is formed with different magnetic poles (N-pole and S-pole) arranged alternately in the circumferential direction thereof. The magnetic encoder 16 has such a thickness that the magnetic encoder 16 is slightly projected from the end portion 11a toward the vehicle inner side under a condition that the magnetic encoder 16 is fixed to the inner ring 11.

A sensor 17 for detecting a magnetic change due to the rotation of the magnetic encoder 16 is attached to the flange 12b of the outer ring 12. The sensor 17 is inserted from the outside into a sensor insertion hole 17a formed in this flange 12b. A distal end of the inserted sensor 17 is disposed in close proximity to the surface on the vehicle inner side of the magnetic encoder 16 to detect the magnetic change.

Next, a description will be given of a protective cover 20 of the invention which is used for the wheel rolling bearing device 10 to protect the annular magnetic encoder 16 attached to the side of the bottom 15a of the recess 15 of this wheel rolling bearing device 10.

As shown in FIG. 2, an annular first disk portion 21 is formed in this protective cover 20 to cover the magnetic encoder 16 which is located in the side of the bottom 15a of the recess 15 of the wheel rolling bearing device 10. This first disk portion 21 has a rib portion 21c extending from a radial inner end 21a of the first disk portion 21 and abutting against the end 11a of the inner ring 11 so that the first disk portion 21 is spaced apart a predetermined distance Y1 from the magnetic encoder 16 toward the vehicle inner side. Since the magnetic encoder 16 is thus covered by the protective cover 20 spaced apart the predetermined distance Y1, the effect of magnetism of the magnetic encoder 16 is reduced, so that the adhesion of a metallic foreign object can be easily prevented. Furthermore, even if another member (peripheral member) abuts against the first disk portion 21, since the first disk portion 21 is not in contact with the magnetic encoder 16 and the predetermined distance Y1 is maintained by the rib portion 21c, so that damage can be prevented from being imparted to the magnetic encoder 16. The radial dimension of this radial inner end 21a is so determined that the radial inner end 21a is located between the inner periphery and the outer periphery of the inner ring 11 at the end 11a.

A cylindrical portion 22 is continuously formed in such a manner as to extend from a radial outer end 21b of this first disk portion 21 in the axial direction of the rear axle shaft 1 and to be fitted to an inner peripheral wall 15b (inner peripheral surface of the outer ring 12 inward of the flange 12b) of the recess 15 of the wheel rolling bearing device 10. Further, a second disk portion 24 is formed which extends in the radially outward direction from that cylindrical portion 22 and covers the end 12a of the outer ring 12 around the recess 15. An annular cover body 23 is thereby formed.

In addition, as shown in FIGS. 3 and 4, a gripper 25 is formed so as to extend in the radially outward direction from this second disk portion 24 toward the outside of a radial outer end 12c of the outer ring 12, and to be adapted to move further outward by being pulled, at the time of removal from the recess 15, in a radial direction X1 intersecting an axial direction Z1 and serving as an example of the vehicle inner side. In addition, a plurality of protrusions 22a are formed on an outer peripheral side of the cylindrical portion 22 in the cover body 23 so as to be provided with a predetermined interference with the inner peripheral wall 15b in order to hold the state of being fitted to the inner peripheral wall 15b of the recess 15.

In addition, lugs 27 are formed on a radial outer end of the second disk portion 24 so as to extend in its radially outward direction and project more than the radial outer end 12c of the outer ring 12. This lug 27 has a suspended piece 32a and is formed so as to block the sensor insertion hole 17a formed on the flange 12b of the outer ring 12 and in which the sensor 17 has not been inserted. The protective cover 20 can be monolithically formed of a plastic material.

Figure 6:
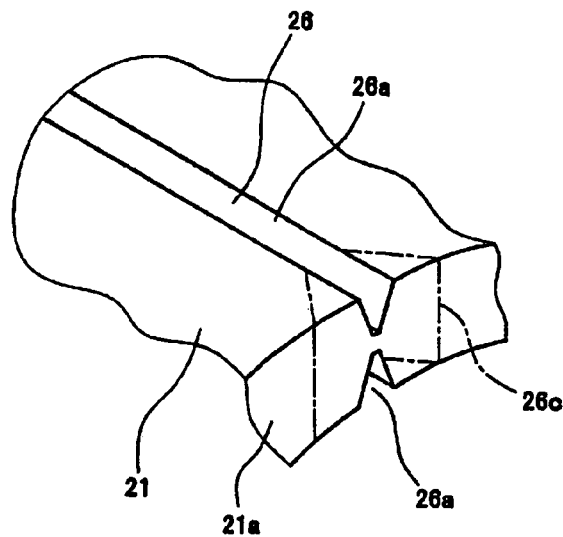
FIG. 6 is a partial enlarged view showing a to-be-separated portion formed by half-cut grooves.

A to-be-separated portion 26 is formed in the cover body 23 so as to extend in its radial direction X1. This to-be-separated portion 26 has its stiffness made partially lower than the other portion in the circumferential direction to thereby allow separation. As shown in FIG. 6, this to-be-separated portion 26 is formed by half-cut grooves 26a cut with a V-shaped cross section (in this example, the half-cut grooves are cut from both obverse and reverse surfaces of the member, but may be cut from one surface alone).

Figure 7:
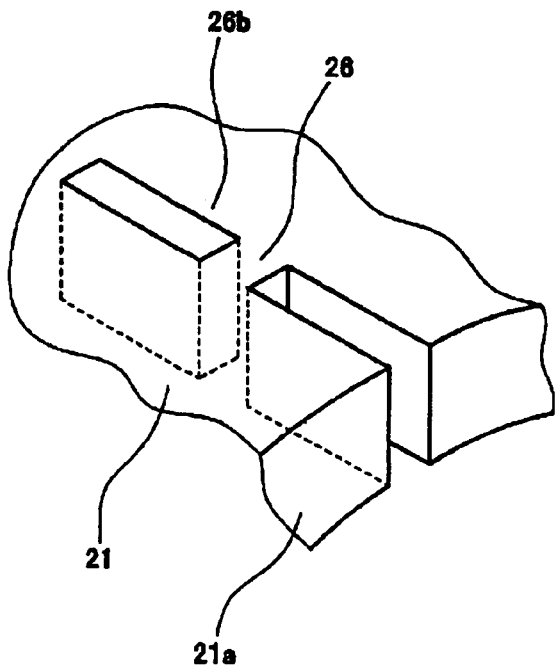
FIG. 7 is a partial enlarged view showing a to-be-separated portion formed by perforations.
Figure 8:
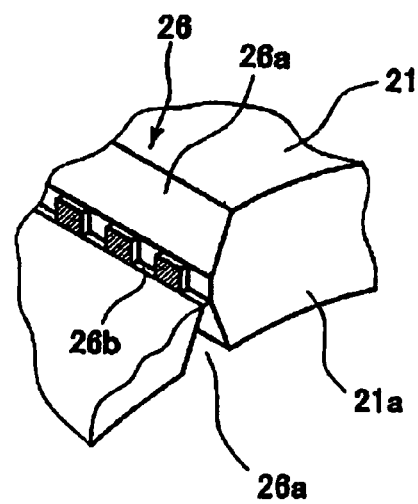
FIG. 8 is a partial enlarged view showing a to-be-separated portion formed by half-cut grooves and perforations.

In addition, as another example of the to-be-separated portion 26, perforations 26b may be formed, as shown in FIG. 7, and these perforations may be used as the to-be-separated portion 26. The to-be-separated portion 26 in still another example may be formed by combining the half-cut grooves 26a and the perforations 26b, as shown in FIG. 8. The lugs 27 are disposed in another radial direction X2 (see FIG. 4) intersecting the radial direction X1 along which the to-be-separated portion 26 is formed.

Further, as shown in FIG. 3, the protective cover 20 is fitted in the recess 15 of the wheel rolling bearing device 10. When the cylindrical portion 22 of the cover body 23 of the protective cover 20 is fitted to the inner peripheral wall 15b forming the recess 15, the protrusions 22a of the cylindrical portion 22 are brought into contact with the inner peripheral wall 15b, thereby allowing the cylindrical portion 22 of the cover body 23 to be fitted and inserted with a predetermined interference.

Next, as an example of assembling the wheel rolling bearing device 10 fitted with the protective cover 20 to the rear axle shaft 1, the rear axle shaft 1 is held vertically, and the wheel rolling bearing device 10 and the peripheral parts F, including the spacer F1 and the retainer ring F2, are dropped down, in that order, onto the rear axle shaft 1 from above that rear axle shaft 1.

Subsequently, the wheel rolling bearing device 10 and the peripheral parts F are simultaneously pressed and fitted onto the press-fitting shaft portion 3 of the rear axle shaft 1 by an unillustrated press-fitting jig until the inner ring 11 of the wheel rolling bearing device 10 abuts against the stepped portion 2 of the rear axle shaft 1. The wheel rolling bearing device 10 is thereby assembled to the rear axle shaft 1.

Figure 9:
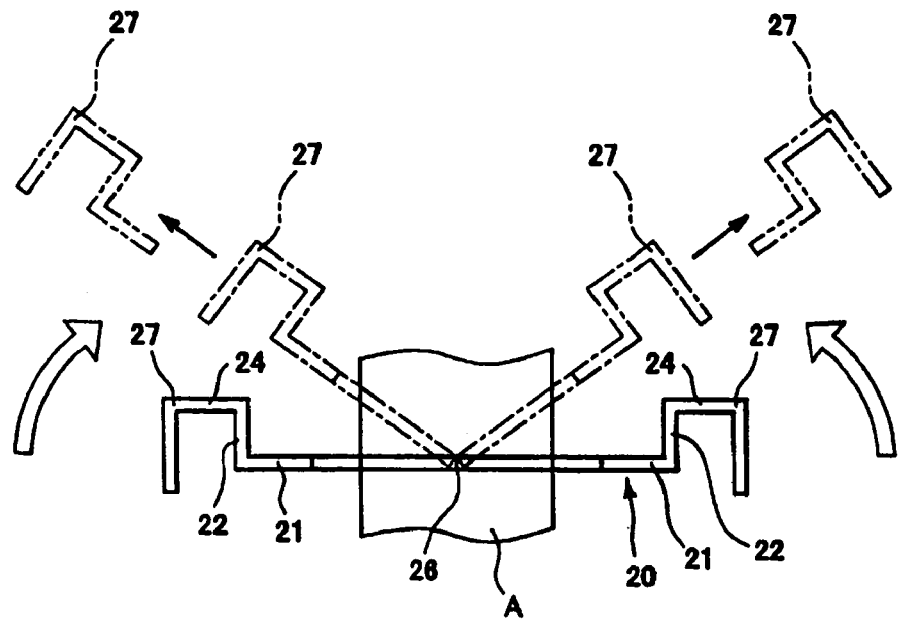
FIG. 9 is a view showing a state that the protective cover is divided.

Subsequently, the protective cover 20 covering the magnetic encoder 16 becomes unnecessary, so that the removal of the protective cover 20 is carried out. In a state in which the protective cover 20 is fitted on the wheel rolling bearing device 10 or in a state in which the protective cover 20 is slightly lifted from the wheel rolling bearing device 10, the lugs 27 on both sides are lifted up toward axial center of the rear axle shaft 1, as shown in FIG. 9, so that the protective cover 20 assumes a valley-folded state at the to-be-separated portion 26. As a result, the to-be-separated portion 26 is fractured, thereby dividing the protective cover 20 into left and right split bodies. Hence, the operation of withdrawal from the rear axle shaft 1 is well facilitated.

Second Embodiment

Figure 10:
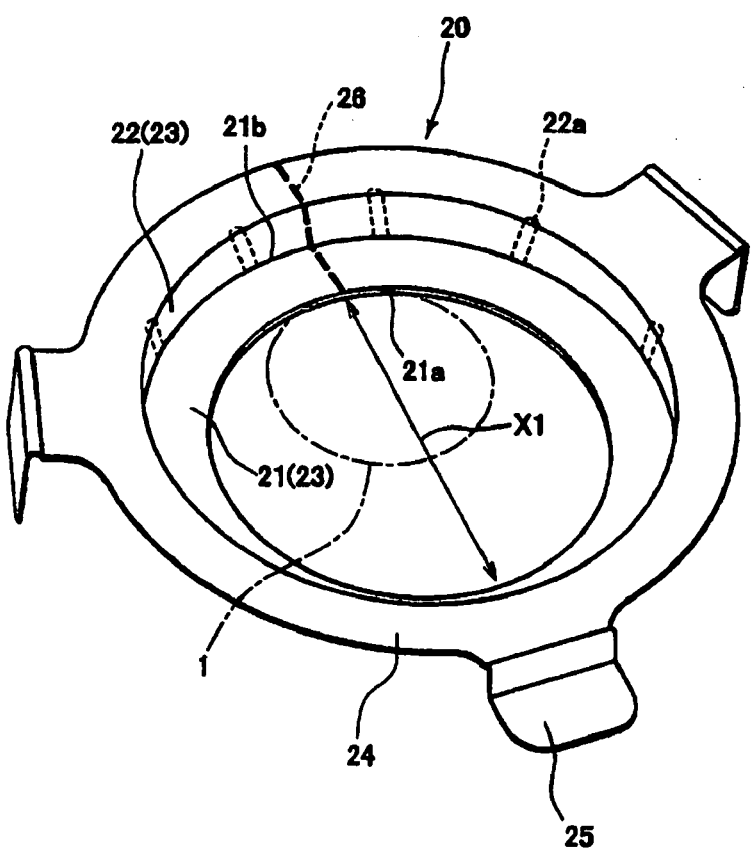
FIG. 10 is a perspective view showing a protective cover according to a second embodiment of the invention.

Next, a description will be given of a second embodiment of the protective cover 20 with reference to FIG. 10. The to-be-separated portion 26 is disposed on an opposite side from the gripper 25 along the pulling direction of the gripper 25 (radial direction X1) so as to extend radially outward from the second disk portion 24. In other words, a single to-be-separated portion 26 is formed at a portion which is to abut against the outer peripheral surface of the rear axle shaft 1 press-fitted to the inner ring 11 the gripper 25 is moved radially outward.

Figure 11:
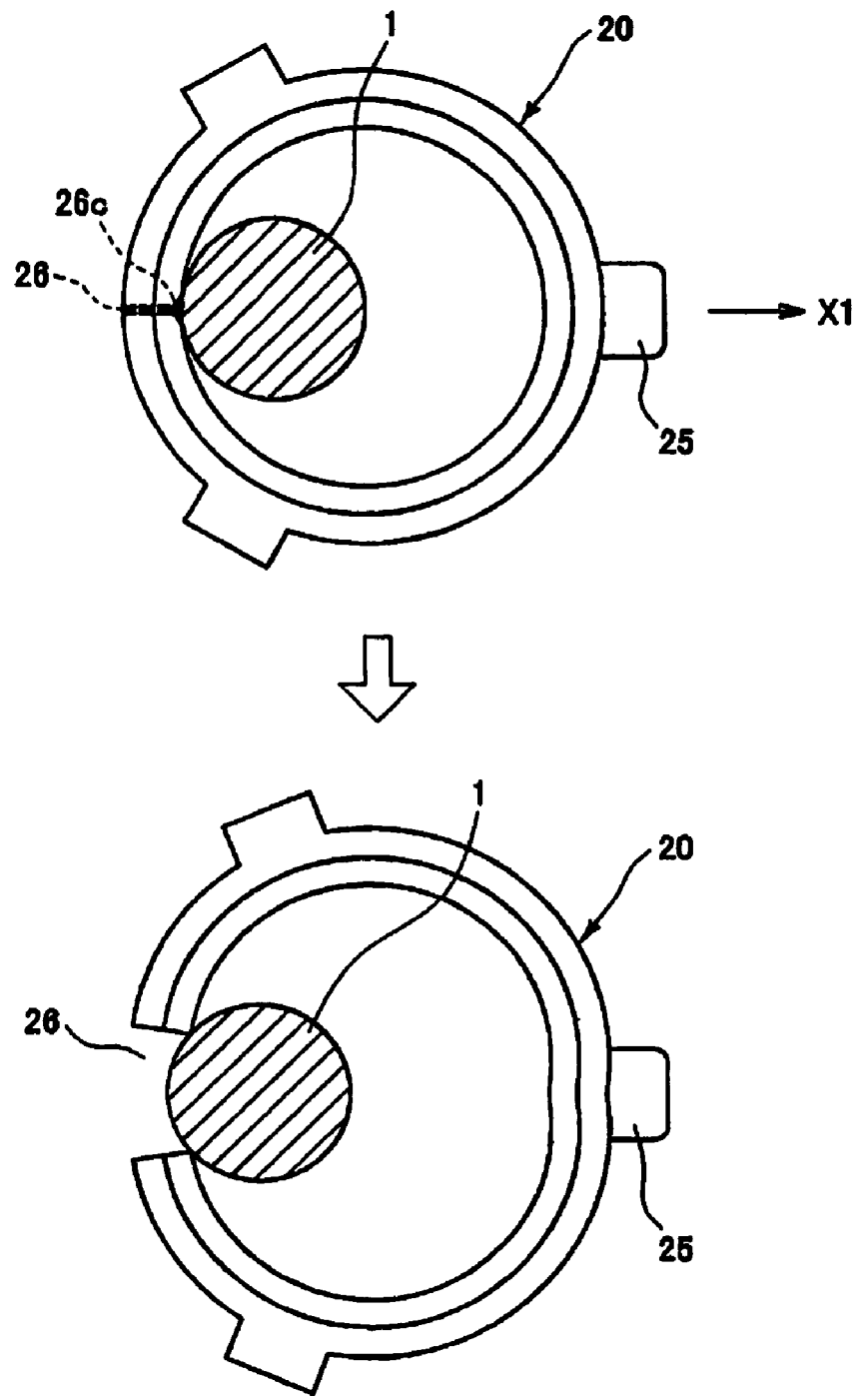
FIG. 11 is a view showing a state that the protective cover shown in FIG. 10 is divided.

In order to remove the protective cover 20 according to this example, the gripper 25 of the protective cover 20 is gripped and is lifted upward so as to remove only the protective cover 20 from the recess 15 of the wheel rolling bearing device 10, as shown in FIG. 11. Subsequently, the gripper 25 is pulled in the radial direction X1 in a state in which the protective cover 20 is slightly lifted upward from the wheel rolling bearing device 10, so that the single to-be-separated portion 26 is consecutively fractured starting with its end side (in an example in which tearing-apart portion 26c is provided, from the tearing-apart portion 26c), and the protective cover 20 is divided at that portion. Hence, it becomes possible to allow the rear axle shaft 1 to be drawn out from between the separated portions of the to-be-separated portion 26.

Figure 12:
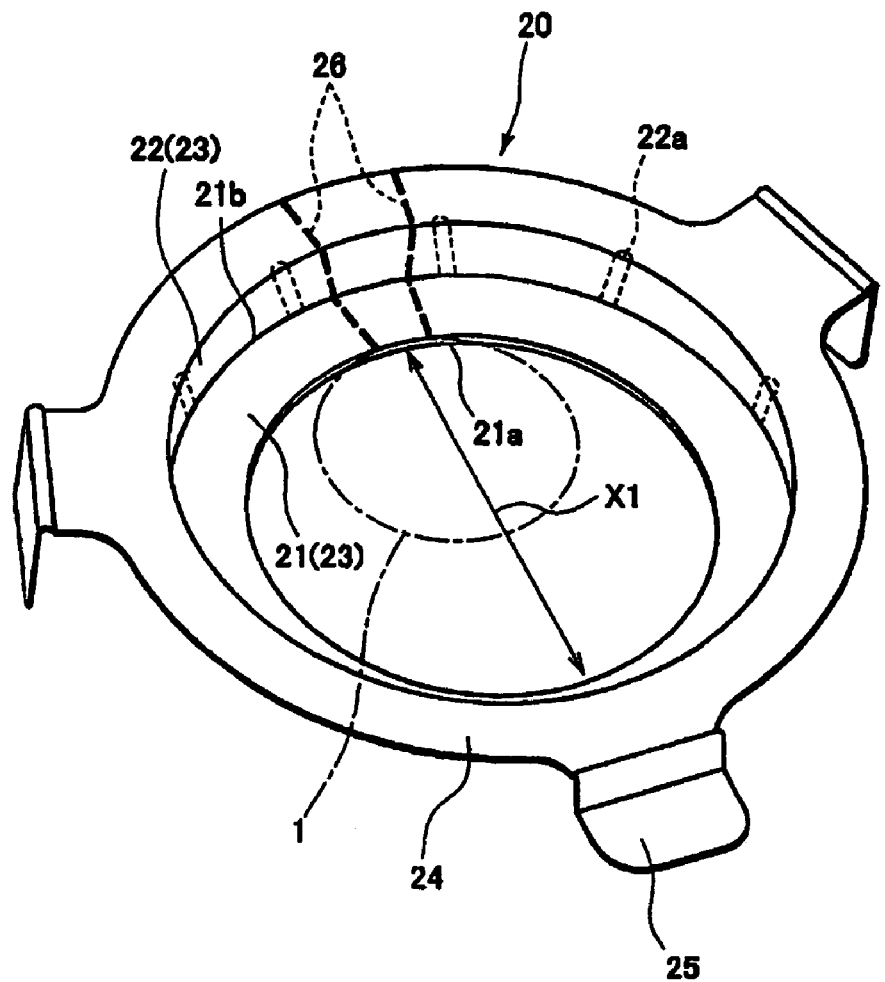
FIG. 12 is a perspective view showing a protective cover according to another embodiment of the invention.

In addition, as shown in FIG. 12, a plurality of (in this example, two) to-be-separated portions 26 which are arranged in the circumferential direction substantially in parallel are formed in the vicinities of the portion where the outer peripheral surface of the rear axle shaft 1 abuts.

Figure 13:
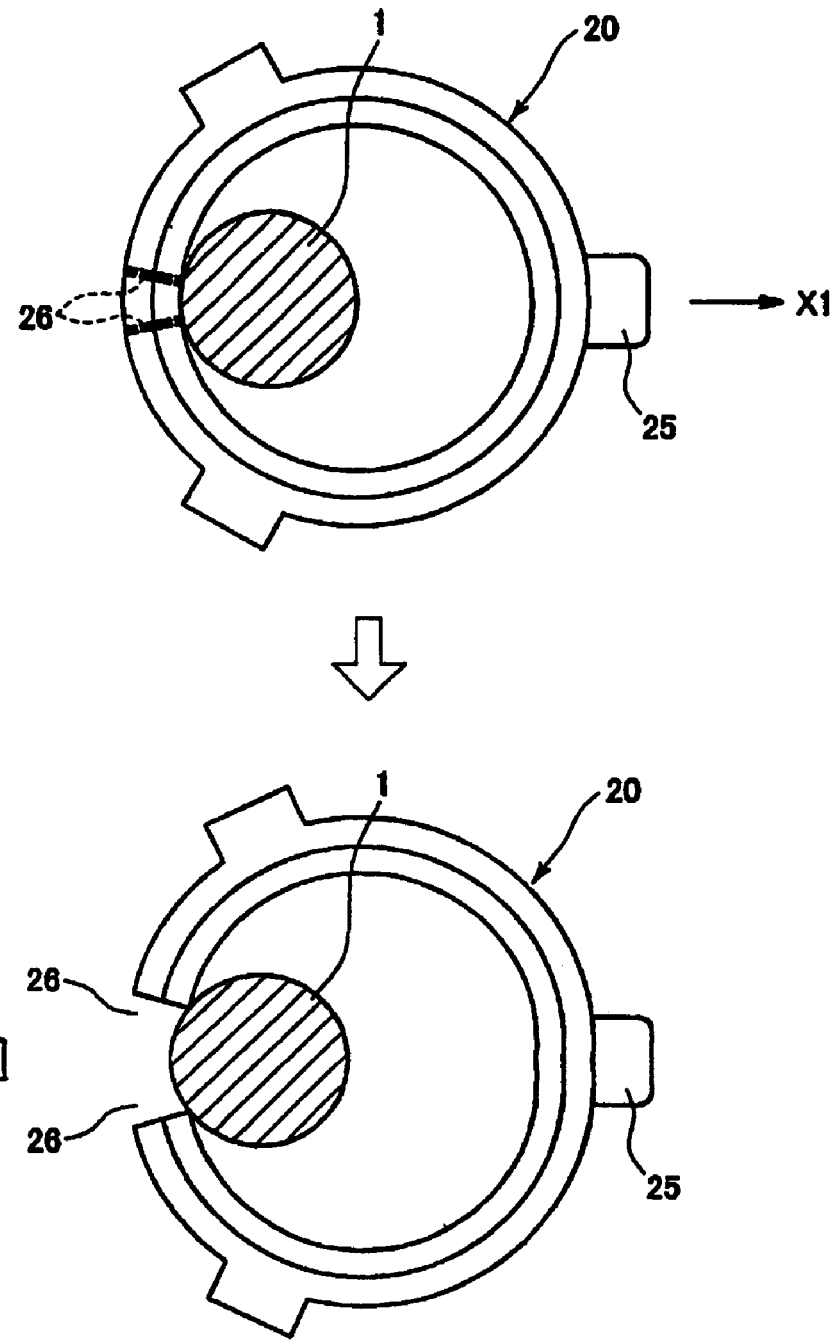
FIG. 13 is a view showing another state that the protective cover shown in FIG. 12 is divided.

In order to remove the protective cover 20 according to this example, as shown in FIG. 13, in the state in which the protective cover 20 is fitted on the wheel rolling bearing device 10 or in the state in which the protective cover 20 is slightly lifted upward from the wheel rolling bearing device 10, the gripper 25 is pulled in the radial direction X1 while end sides of the to-be-separated portions 26 are being abutted against the outer peripheral surface of the rear axle shaft 1, the two to-be-separated portions 26 are consecutively fractured starting with their end sides (in an example in which the tearing-apart portions 26c are provided, from the tearing-apart portions 26c), and the protective cover 20 is separated at those portions. Hence, it becomes possible to allow the rear axle shaft 1 to be drawn out from between the separated to-be-separated portions 26.

Third Embodiment

Hereafter, a description will be given of a third embodiment of the invention. It is assumed that the rolling bearing device for a wheel fitted with the protective cover according to the third embodiment is identical to the rolling bearing device for a wheel according to the first embodiment.

Figure 14:
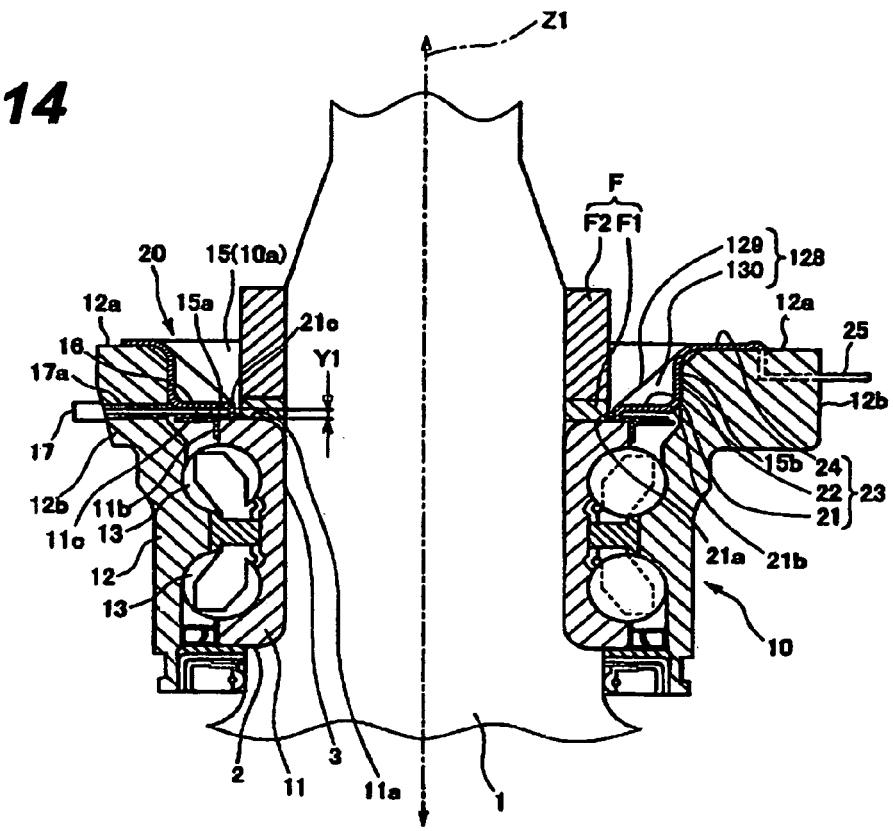
FIG. 14 is a section view showing an assembled state of a wheel rolling bearing device wherein a protective cover according to a third embodiment of the invention is attached.
Figure 15:
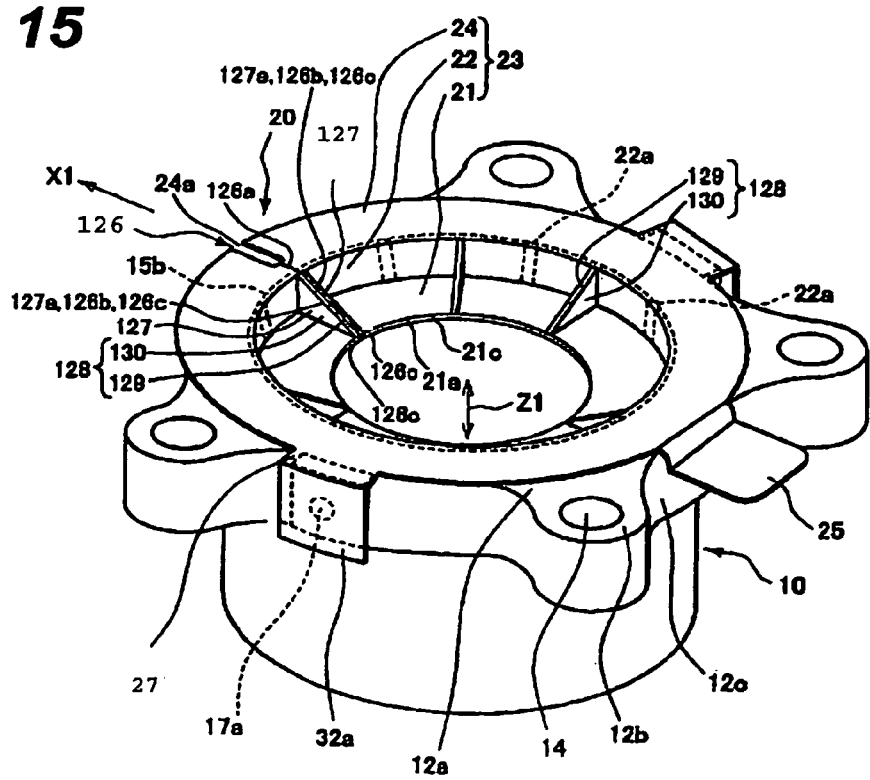
FIG. 15 is a perspective view of the wheel rolling bearing device shown in FIG. 14.
Figure 16:
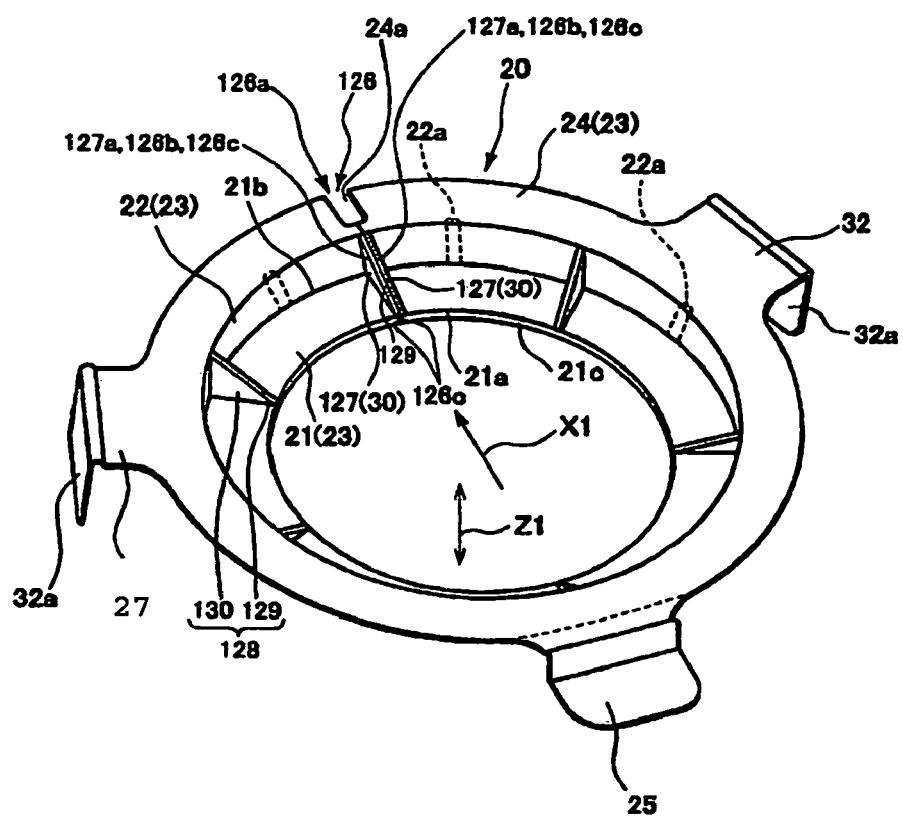
FIG. 16 is a perspective view of the protective cover shown in FIG. 15.
Figure 17:
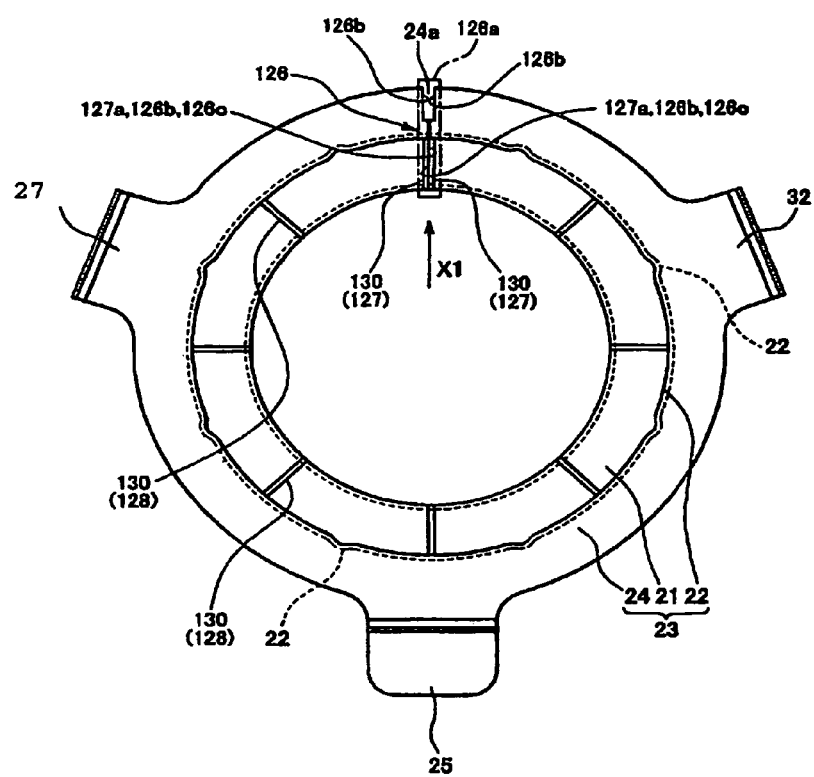
FIG. 17 is a plan view of the protective cover shown in FIG. 15.
Figure 18:
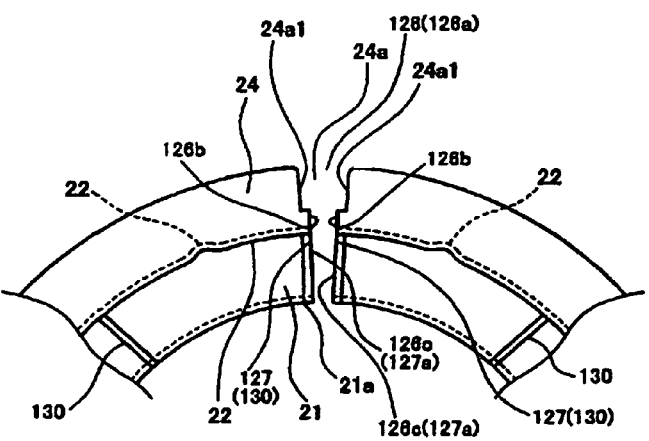
FIG. 18 is a partial enlarged view of the protective cover shown in FIG. 17.
Figure 19A:
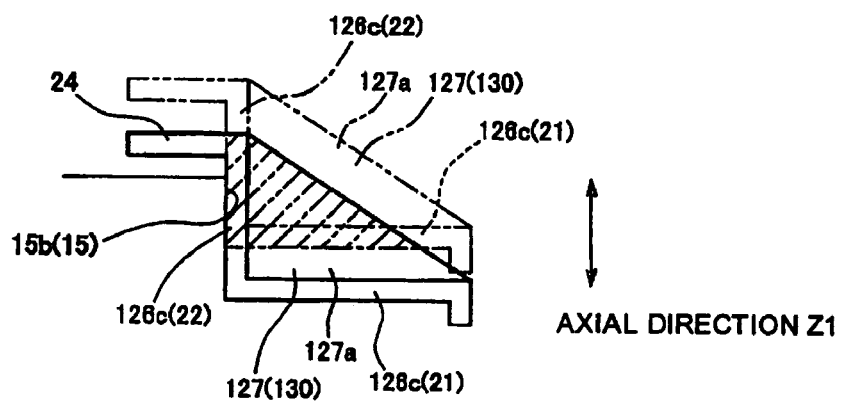
FIGS. 19(a) and 19(b) are views showing offset states of a to-be-separated portion of the protective cover.
Figure 19B:
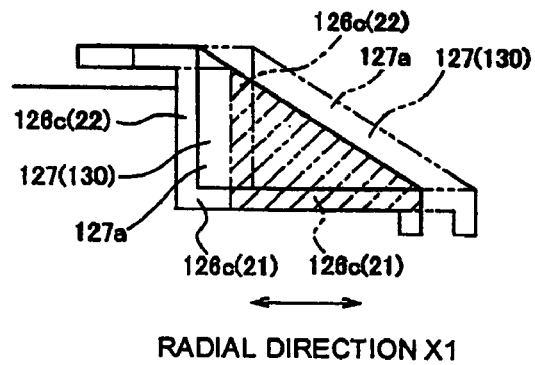
Figure 20:
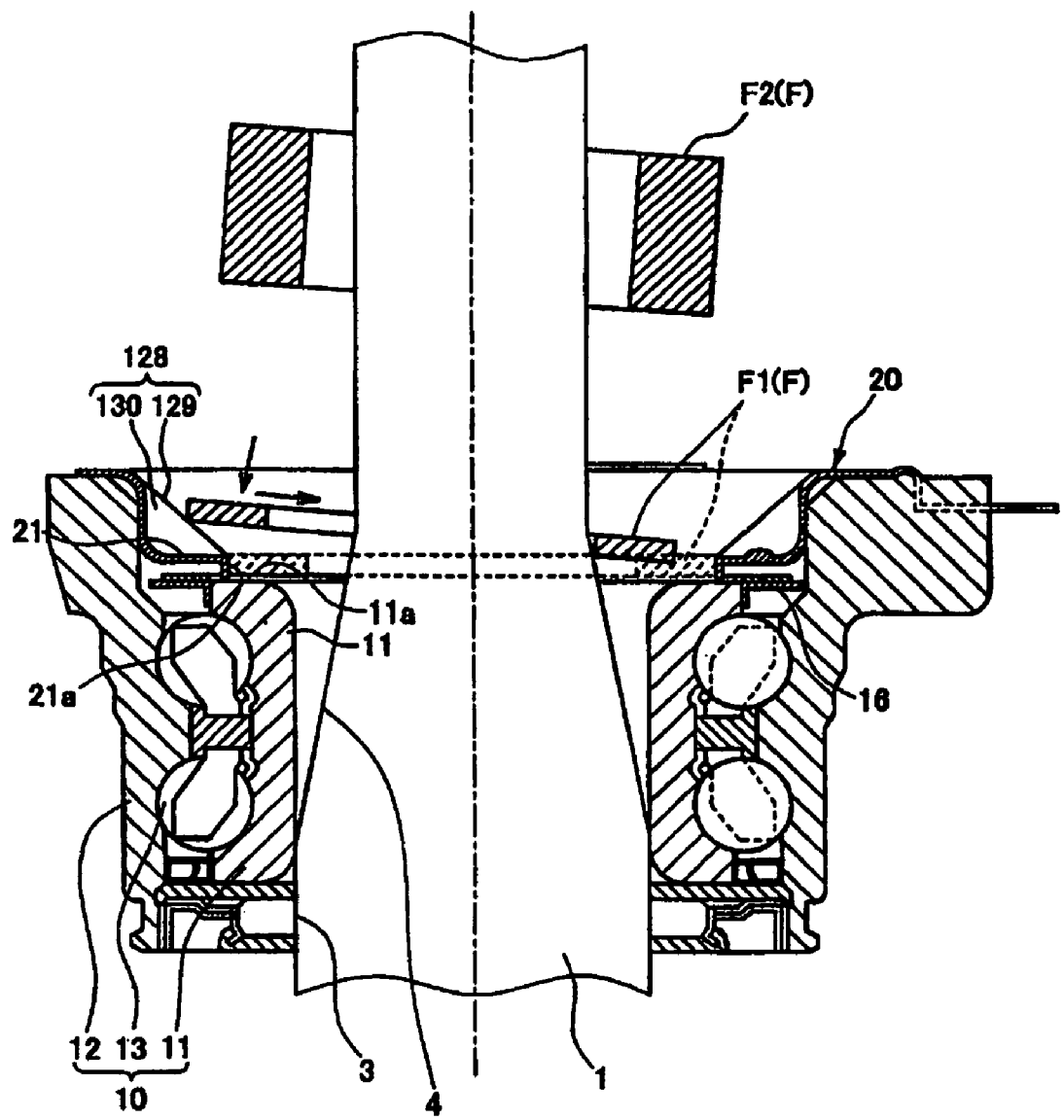
FIG. 20 is a view showing a state that a wheel rolling bearing device wherein a protective cover is attached is assembled with a rear axle shaft.
Figure 21:
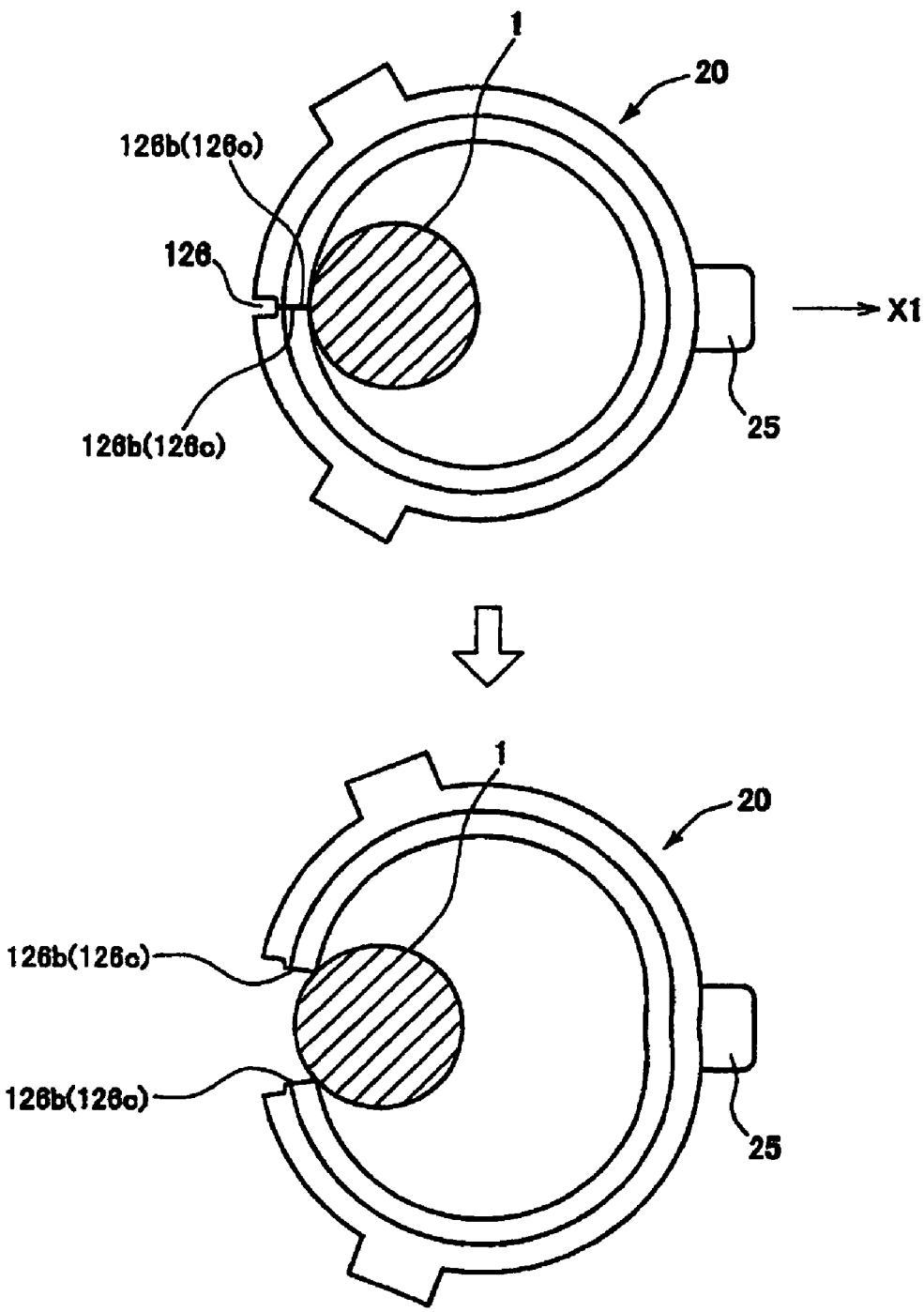
FIG. 21 is a view showing a state that the protective cover is removed from the rear axle shaft.

FIG. 14 is a section view showing an assembled state of the wheel rolling bearing device wherein the protective cover according to the third embodiment of the invention is attached. FIG. 15 is a perspective view of the wheel rolling bearing device shown in FIG. 14. FIG. 16 is a perspective view of the protective cover shown in FIG. 15. FIG. 17 is a plan view of the protective cover shown in FIG. 15. FIG. 18 is a partial enlarged view of the protective cover shown in FIG. 17. FIG. 19 is a view showing offset states of a to-be-separated portion of the protective cover. FIG. 20 is a view showing a state that a wheel rolling bearing device wherein a protective cover is attached is assembled with a rear axle shaft. FIG. 21 is a view showing a state that the protective cover is removed from the rear axle shaft.

With the protective cover according to the third embodiment, those component portions that are identical to those of the protective cover according to the first embodiment will be denoted by the same reference numerals, and explanations thereof will be omitted. In addition, with the protective cover according to the third embodiment, explanations for advantageous effects and modifications which are common to the protective cover according to the first embodiment will be omitted, and a description will be given of only those arrangements, advantageous effects, and modifications that differ from the protective cover according to the first embodiment.

As shown in FIGS. 16 to 18, a to-be-separated portion 126 is formed in the cover body 23 so as to extend in its radial direction X1. This to-be-separated portion 126 has its stiffness made partially lower than the other portion in the circumferential direction to thereby allow separation. As separated surfaces 126b on both sides, which are separated in advance by a slit 126a (separation zone) serving as a separation zone in the radial direction X1, are butted against each other, the to-be-separated portion 126 has its stiffness formed to be partially lower than the other portion in the circumferential direction, so that the separated surfaces 126b can be reseparated.

Respective ones of the separated surfaces 126b on both sides separated by the slit 126a are constituted by abutment surfaces 126c in which at least their radially inner sides are brought into close contact with each other when the cylindrical portion 22 of the cover body 23 is inserted and held in the recess 15 of the wheel rolling bearing device 10, and which are reseparated by opening up in the circumferential direction when the cylindrical portion 22 of the cover body 23 is removed from the recess 15. Each of these abutment surfaces 126c on the radially inner side is formed so as to extend from the radially inner end 21a of the first disk portion 21 toward an outer vicinity of the radially inner end (inner peripheral surface of the cylindrical portion 22) of the second disk portion 24 via the cylindrical portion 22.

In addition, as shown in FIG. 18, a wide notched portion 24a which is larger than the interval between the abutment surfaces 126c on both sides is formed between radially outer sides of the abutment surfaces 126c in the second disk portion 24. Even if the cylindrical portion 22 of the cover body 23 is inserted and held in the recess 15 of the wheel rolling bearing device 10, circumferential both ends 24a1 of the notched portion 24a do not interfere (overlap) with each other by virtue of this notched portion 24a.

In addition, as shown in FIG. 15, wall portions 127 projecting toward the vehicle inner side are respectively formed along the abutment surfaces 126c on both sides, and opposing surfaces 127a of these both wall portions 127 abut against each other in the circumferential direction when the cylindrical portion 22 of the cover body 23 is inserted and held in the recess 15 of the wheel rolling bearing device 10. This opposing surface 127a of the wall portion 127 and the abutment surface 126c are formed in the form of continuous surfaces, so that simultaneous close contact is made possible. For this reason, even when one abutment surface 126c is offset from the other abutment surface 126c in the axial direction Z1 (see the hatched portion in FIG. 19(a)), or when one abutment surface 126c is offset from the other abutment surface 126c in the radial direction X1 (see the hatched portion in FIG. 19(b)), the opposing surfaces 127a of the wall portions 127 are constantly brought into contact with each other by virtue of the projecting height and the length in the radial direction X1 of the wall portions 127. Hence, the holding of the stiffness when the cylindrical portion 22 of the cover body 23 is inserted and held in the recess 15 of the wheel rolling bearing device 10 is not impaired.

As shown in FIG. 16, guide wall portions 128 are provided on the cover body 23 in addition to the wall portions 127. These guide wall portions 128 are formed so as to be reduced in diameter from the side remote from the bottom 15a of the recess 15 toward the side close thereto in the axial direction Z1 of the rear axle shaft 1. In a case where the peripheral parts F including the spacer F1 and the retainer ring F2 for fixing the wheel rolling bearing device 10 are dropped by their own weight in the axial direction Z1 along the rear axle shaft 1 held vertically to be mounted thereon, the guide portions 128 have a guiding function so that the peripheral parts F are centered with respect to a center line of the rear axle shaft 1 as the peripheral parts F approach the protective cover 20.

These guide portions 128 can be formed by disposing in the circumferential direction a plurality of rib pieces 130 each having a sloped edge portion 129 extending from the cylindrical portion 22 to the radially inner end 21a of the first disk portion 21. In other words, the wall portions 127 can be regarded as ones formed by dividing one of the rib pieces 130 at the middle of its thickness in the circumferential direction. Thus, the contact area becomes large with respect to the offset between the abutment surfaces 126c in the axial direction Z1 and/or in the radial direction X1.

The plurality of rib pieces 130 are arranged in the circumferential direction of the cylindrical portion 22 so that each of which is arranged between adjacent ones of the protrusions 22a. In addition, the single rib piece 130 which serves as the wall portions 127 is disposed on an opposite side from the gripper 25 along the pulling direction of the gripper 25 extending radially outward from the second disk portion 24.

As shown in FIG. 15, the protective cover 20 is fitted to the recess 15 of the wheel rolling bearing device 10. When the cylindrical portion 22 of the cover body 23 of the protective cover 20 is fitted to the inner peripheral wall 15b forming the recess 15, the protrusions 22a of the cylindrical portion 22 are brought into contact with the inner peripheral wall 15b, thereby allowing the cylindrical portion 22 of the cover body 23 to be fitted and inserted with a predetermined interference in a state in which parts (abutment surfaces 26c) of the separated surfaces 126b of the to-be-separated portion 126 are butted against each other. As the to-be-separated portion 126 resists the tightening force with respect to the shrinkage in diameter due to the tightening force in the inward direction of the radial direction X1 owing to the fitting operation, the fitting state is maintained. Thus, when the cover body 23 is inserted and held in the recess 15, the cover body 23 entirely protects the magnetic encoder 16.

Next, as an example of assembling the wheel rolling bearing device 10 fitted with the protective cover 20 to the rear axle shaft 1, as shown in FIG. 20, when the wheel rolling bearing device 10 and the peripheral parts 2, including the spacer F1 and the retainer ring F, are dropped down in that order from above the rear axle shaft 1 held vertically, the initially dropped-down wheel rolling bearing device 10 is disposed on the upper end side of the press-fitting shaft portion 3 while being guided by a tapered shaft portion 4 formed continuously with the press-fitting shaft portion 3 of the rear axle shaft 1, such that the axis of the wheel rolling bearing device 10 becomes coaxial with the center line of the rear axle shaft 1.

The peripheral parts F which are dropped down subsequent to the wheel rolling bearing device 10 moves downward in an eccentric state of being inclined with respect to the center line of the rear axle shaft 1. However, radial outer edges of lower ends of the peripheral parts F slide on the sloped edge portions 129 of the rib pieces 130 serving as the guide portions 128 of the protective cover 20, and the axes of the peripheral parts F become coaxial with the axis of the wheel rolling bearing device 10 (which is also the center line of the rear axle shaft 1), so that the peripheral parts F are disposed on the end 11a of the inner ring 11 which is at the inner position of the radially inner end 21a of the first disk portion 21 of the protective cover 20.

Subsequently, the wheel rolling bearing device 10 and the peripheral parts F are simultaneously pressed and fitted onto the press-fitting shaft portion 3 of the rear axle shaft 1 by an unillustrated press-fitting jig until the inner ring 11 of the wheel rolling bearing device 10 abuts against the stepped portion 2 of the rear axle shaft 1. The wheel rolling bearing device 10 is thereby assembled to the rear axle shaft 1.

Subsequently, the protective cover 20 covering the magnetic encoder 16 becomes unnecessary, so that the removal of the protective cover 20 is carried out. As shown in FIG. 21, the gripper 25 of the protective cover 20 is gripped, and is lifted upward so as to remove only the protective cover 20 from the recess 15 of the wheel rolling bearing device 10. Incidentally, the abutment surfaces 126c of the separated surfaces 126b at the to-be-separated portion 126 are opened up in the circumferential direction and are reseparated.

Subsequently, when the gripper 25 is pulled toward the radial direction X1 side in a state in which the protective cover 20 is slightly lifted upward from the wheel rolling bearing device 10, the rear axle shaft 1 is allowed to pass between parts (abutment surfaces 126c) of the separated surfaces 126b at the separated to-be-separated portion 126, so that this protective cover 20 is removed.

In terms of the method of manufacturing this protective cover 20, as shown in FIGS. 22(a) and 22(b), molten resin is injected into a cavity 120 formed between an upper mold 100 and a lower mold 110 by way of an injection port 101. Subsequently, after the resin is cooled and solidified, the mold is opened and a protective cover material 200 as a molding is taken out, and the protective cover material 200 is thus monolithically formed as the protective cover 20. Incidentally, the protective cover 20 is monolithically molded from a high polymer material (in this example, polypropylene as a general-purpose plastic material).

Thus, in the protective cover 20, a part of the cover body 23 is divided at the to-be-separated portion 126. For this reason, it is possible to provide the protective cover 20 which can be easily removed from the rear axle shaft 1 and the recess 15 of the wheel rolling bearing device 10.

Figure 23:
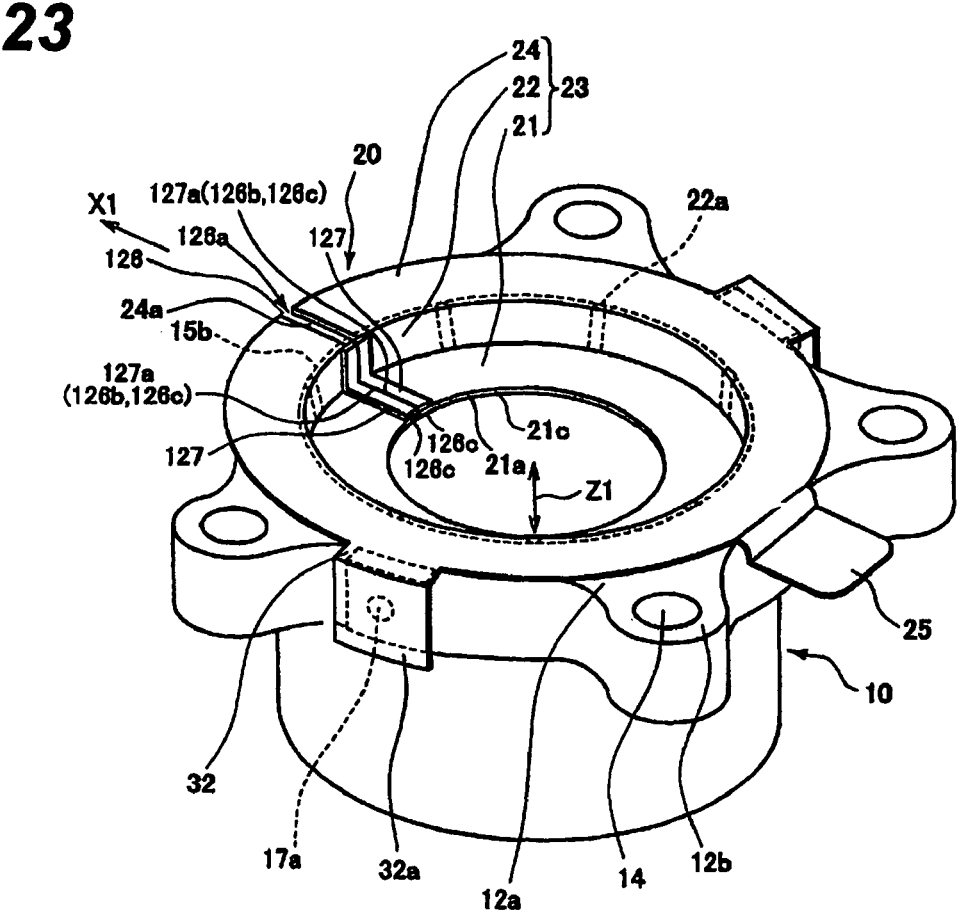
FIG. 23 is a perspective view showing a modified example of FIG. 15.

As shown in FIG. 23, a still another example of the to-be-separated portion 126 is constituted by the abutment surfaces 126c of the separated surfaces 126b on both sides separated by the slit 126a. Each of these abutment surfaces 126c on the radially inner side is formed so as to extend from the radially inner end 21a of the first disk portion 21 to the outer vicinity of the radially inner end (inner peripheral surface of the cylindrical portion 22) of the second disk portion 24 via the cylindrical portion 22. In addition, the wide notched portion 24a which is larger than the interval between the abutment surfaces 126c on both sides is formed between the radially outer sides of the abutment surfaces 126c in the second disk portion 24. Even if the cylindrical portion 22 of the cover body 23 is inserted and held in the recess 15 of the wheel rolling bearing device 10, the circumferential both ends 24a1 of the notched portion 24a do not interfere (overlap) with each other by virtue of this notched portion 24a. The wall portions 127 projecting toward the vehicle inner side from the first disk portion 21 and toward the radially inner side of the cylindrical portion 22 are respectively formed along these abutment surfaces 126c on both sides. The opposing surfaces 127a of these both wall portions 127 abut against each other in the circumferential direction when the cylindrical portion 22 of the cover body 23 is inserted and held in the recess 15 of the wheel rolling bearing device 10. Although other component members similar to those in the above-described other embodiments are provided, detailed explanations for those will be omitted.

Figure 24:
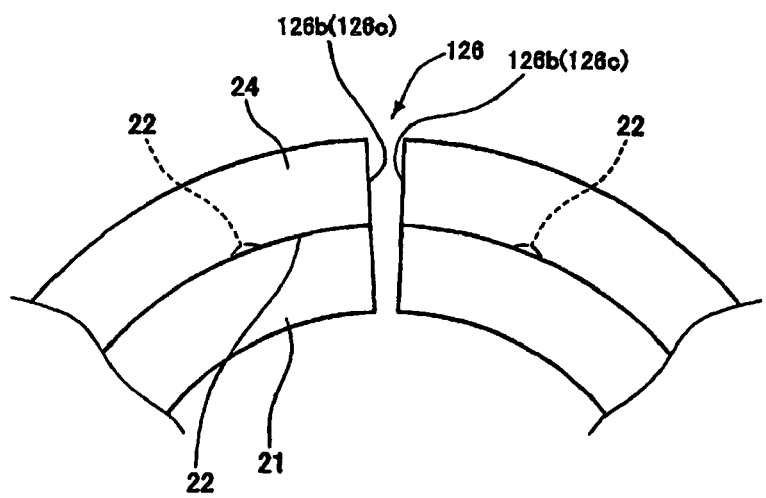
FIG. 24 is a partial enlarged view showing another modified example of the protective cover.
Figure 25:
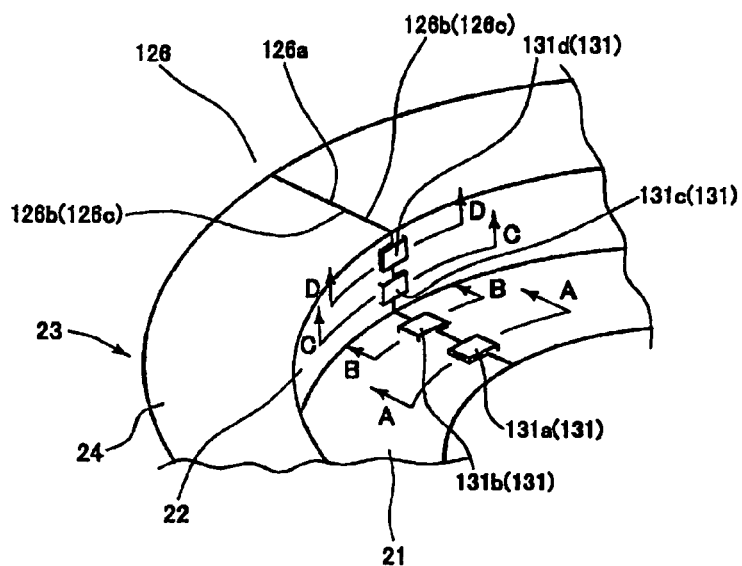
FIG. 25 is a partial enlarged view showing still another modified example of the protective cover.
Figure 26A:
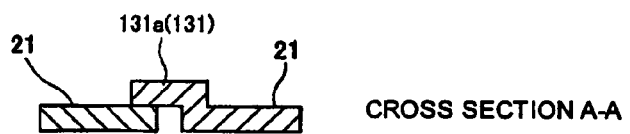
FIGS. 26(a) and 26(d) are section views taken along the lines A-A, B-B, C-C and D-D of FIG. 25, respectively.
Figure 26B:
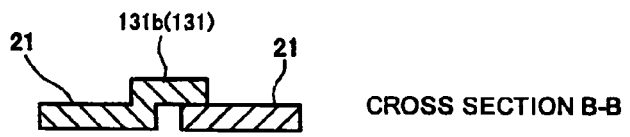
Figure 26C:
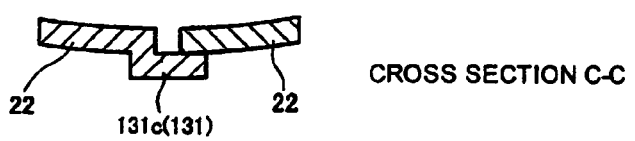
Figure 26D:
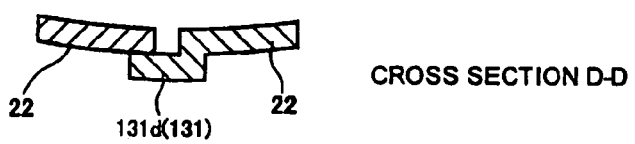

As a further example of the to-be-separated portion 126, as shown in FIG. 24, the separated surface 126b which continues from the first disk portion 21 to the second disk portion 24 via the cylindrical portion 22 may be caused to serve as the abutment surface 126c. Although other component members similar to those in the above-described other embodiments are provided, detailed explanations for those will be omitted.

As a still further example of the protective cover 20, as shown in FIGS. 25 and 26(a) to 26(d), a plurality of retaining pawls 131 serving as engaging portions for integrating the cover body 23 are formed on the cover body 23 in which the separated surfaces 126b (abutment surfaces 126c) of the slit 126a in the to-be-separated portion 126 are formed.

These engaging pawls 131 include disk engaging pawls 131a each extending from the obverse surface of the first disk portion 21 where one separated surface 126b is formed to over the obverse surface of the first disk portion 21 where the other separated surface 126b is formed, as well as disk engaging pawls 131b each extending from the obverse surface of the first disk portion 21 where the other separated surface 126b is formed to over the obverse surface of the first disk portion 21 where the one separated surface 126b is formed. The offset of the first disk portion 21 with respect to the axial direction Z1 is prevented by the disk engaging pawls 131a and the disk engaging pawls 131b on both sides.

In addition, the engaging pawls 131 further include cylindrical engaging pawls 131c each extending from the inner peripheral surface of the cylindrical portion 22 where the one separated surface 126b is formed to over the inner peripheral surface of the cylindrical portion 22 where the other separated surface 126b is formed, as well as cylindrical engaging pawls 131d each extending from the inner peripheral surface of the cylindrical portion 22 where the other separated surface 126b is formed to over the inner peripheral surface of the cylindrical portion 22 where the one separated surface 126b is formed. The offset of the cylindrical portion 22 with respect to the radial direction X1 is prevented by the cylindrical engaging pawls 131c and the cylindrical engaging pawls 131d on both sides.

The disk engaging pawls 131a, the disk engaging pawls 131b, the cylindrical engaging pawls 131c, and the cylindrical engaging pawls 131d may be extended with substantially the same thickness as that of the first disk portion 21 and the cylindrical portion 22, as shown in the drawings. However, in a case where the thickness of each pawl is made, for example, substantially half the thickness of the first disk portion 21 and the cylindrical portion 22, and where the obverse surfaces of the first disk portion 21 and the cylindrical portion 22 to be overlapped with these pawls are recessed in correspondence with the thickness of these pawls, the obverse surfaces of the first disk portion 21 and the inner peripheral surface of the cylindrical portion 22 can be made flush.

In this example, there is provided function for preventing the offset of the separated surfaces 126b (abutment surfaces 126c) in the axial direction Z1 and the radial direction X1 when the protective cover 20 is fitted in the recess 15 of the wheel rolling bearing device 10. In this example, the rib pieces 130 of the guide portions 128 are not used as the wall portions 127, but by providing the rib pieces 130 of the guide portions 128 at positions where they do not overlap with the separated surfaces 126b (abutment surfaces 126c), it is possible to provide a guiding function so that the peripheral parts F, such as the spacer F1 and the retainer ring F2 for fixing the wheel rolling bearing device 10, will be centered with respect to the center line of the rear axle shaft 1 by the guide portions 128.

The invention claimed is:

1. A protective cover configured to protect an annular magnetic encoder, the protective cover comprising:
a removal portion causing the protective cover attached to the magnetic encoder to be removable from the magnetic encoder,
wherein said removal portion comprises at least one indentation in the protective cover such that upon a removal of the protective cover from the magnetic encoder, the removal portion splits the protective cover into detached portions.

2. A wheel rolling bearing device, comprising:
an outer ring;
an inner ring, disposed coaxially with the outer ring;
a rolling element, disposed between the outer ring and the inner ring;
an axle shaft, extending through the inner ring in an axial direction thereof;
a recess, formed in a vehicle inner side of the wheel rolling bearing device;
an annular magnetic encoder, attached to a bottom side of the recess; and
the protective cover as set forth in claim 1, covering the magnetic encoder.

3. The protective cover as set forth in claim 1, wherein the at least one indentation comprises a to-be-separated portion comprising at least one of half-cut grooves and perforations extending in a radial direction of the protective cover.

4. The protective cover as set forth in claim 1, wherein the cover body comprises the at least one indentation that comprises a to-be-separated portion extending in a radial direction of the protective cover, and has a stiffness less than a stiffness of another part in a circumferential direction of the cover body, thereby being separable.

5. The protective cover as set forth in claim 1, wherein the cover body comprises the at least one indentation that comprises a to-be-separated portion comprising separated surfaces which are separated in advance by a separating zone extending in a radial direction of the protective cover and are abutted against each other, such that the cover body has a stiffness less than a stiffness of another part in a circumferential direction of the cover body, thereby being reseparable.

6. The protective cover as set forth in claim 1, wherein the protective cover comprises a cylindrical portion for engaging with a wheel rolling bearing device which comprises:
an inner ring, adapted to be fitted with an outer periphery of an axle shaft by inserting the axle shaft in an axial direction thereof;
an outer ring, disposed coaxially with the inner ring and fixed on an axle housing; and
a rolling element, disposed between the inner ring and the outer ring.

7. The protective cover as set forth in claim 6, wherein an end portion of the outer ring is projected from an end portion of the inner ring so that an annular recess is formed in a vehicle inner side of the wheel rolling bearing device,
wherein the annular magnetic encoder is attached to the inner ring located in a bottom side of the recess,
wherein the protective cover comprises an annular cover body which comprises:
a first disk portion, covering the magnetic encoder while being spaced from the magnetic encoder by a prescribed distance toward the vehicle inner side;
the cylindrical portion, extending from a radial outer end of the first disk portion in the axial direction, and fitted into an inner circumferential wall of the recess; and
a second disk portion, extending radially outward from an upper end of the cylindrical portion, and covering the end portion of the outer ring located around the recess.

8. The protective cover as set forth in claim 7, wherein the cover body comprises the at least one indentation that comprises a to-be-separated portion comprising at least one of half-cut grooves and perforations extending in a radial direction of the cover body, and
wherein the cover body comprises lugs which are projected radially outward from both sides of a radial outer end of the second disk portion in another radial direction intersecting with the radial direction.

9. The protective cover as set forth in claim 7, wherein the radial outer end of the second disk portion of the cover body comprises a gripper extending radially outward and being projected from a radial outer end of the outer ring, and
wherein the at least one indentation comprises a to-be-separated portion comprising at least one of half-cut grooves and perforations formed so as to extend from the first disk portion to the second disk portion at such a position that is brought into contact with an outer peripheral surface of the axle shaft press-fitted into the inner ring when the gripper is moved radially outward, or at a vicinity of the position.

10. The protective cover as set forth in claim 7, wherein the cover body comprises the at least one indentation that comprises a to-be-separated portion comprising separated surfaces which are separated in advance by a separating zone extending in a radial direction of the cover body and are abutted against each other, so that the cover body has a partial stiffness less than a stiffness of another part in a circumferential direction of the cover body, thereby being reseparable,
wherein the cover body is monolithic to protect the magnetic encoder when the cover body is inserted and held in the recess of the wheel rolling bearing device, and
wherein the cover body is configured to be moved to the vehicle inner side intersecting with the axial direction while the to-be-separated portion is reseparated and opened in the circumferential direction when the cover body is detached from the recess after the axle shaft is inserted and fixed to the wheel rolling bearing device, so that the cover body is removed from the wheel rolling bearing device and the axle shaft.

11. The protective cover as set forth in claim 10, wherein the separated surfaces located in both sides of the separating zone include abutment surfaces at least parts of which are brought into close contact with each other when the cover body is inserted and held in the recess of the wheel rolling bearing device, and are reseparated and opened in the circumferential direction when the cover body is detached from the recess.

12. The protective cover as set forth in claim 10, wherein wall portions are formed along the abutment surfaces so as to project toward the vehicle inner side, and are configured to be brought into contact with each other in the circumferential direction when the cover body is inserted and held in the recess of the wheel rolling bearing device.

13. The protective cover as set forth in claim 7, wherein the cover body comprises the at least one indentation that comprises a to-be-separated portion extending in a radial direction of the cover body, and having a partial stiffness less than a stiffness of another part in a circumferential direction of the cover body, thereby being separable,
   wherein the cover body is monolithic to protect the magnetic encoder when the cover body is inserted and held in the recess of the wheel rolling bearing device, and
   wherein the cover body is configured to be moved to the vehicle inner side intersecting with the axial direction while the to-be-separated portion is separated and opened in the circumferential direction when the cover body is detached from the recess after the axle shaft is inserted and fixed to the wheel rolling bearing device, so that the cover body is removed from the wheel rolling bearing device and the axle shaft.

14. The protective cover as set forth in claim 13, wherein the radial outer end of the second disk portion comprises a gripper extending radially outward and being projected from a radial outer end of the outer ring, and configured to be moved further outward by being pulled toward the vehicle inner side intersecting with the axial direction when the cover body is detached from the recess, and
   wherein the to-be-separated portion is formed on the cover body so as to extend in a direction that the gripper is pulled.

15. A wheel rolling bearing device, wherein the protective cover as set forth in claim 13 is inserted and held in the recess,
   wherein the inner ring is fitted with an outer periphery of the axle shaft by inserting the axle shaft in the axial direction, and
   wherein the outer ring is disposed coaxially with the inner ring and fixed to the axle housing.

16. A method of attaching and detaching a protective cover, the method comprising:
   inserting and holding the protective cover as set forth in claim 13; and
   moving the cover body to the vehicle inner side intersecting with the axial direction so that the to-be-separated portion is separated and opened in the circumferential direction when the cover body is detached from the recess after the axle shaft is inserted and fixed to the wheel rolling bearing device, thereby removing the cover body from the wheel rolling bearing device and the axle shaft.

* * * * *